United States Patent [19]

Levy

[11] 4,238,443

[45] Dec. 9, 1980

[54] PROCESS FOR TRANSVERSELY STRETCHING POLYETHYLENE TEREPHTHALATE FILM

[75] Inventor: Stanley B. Levy, Wilmington, Del.

[73] Assignee: E. I. Du Pont de Nemours and Company, Wilmington, Del.

[21] Appl. No.: 65,067

[22] Filed: Aug. 9, 1979

[51] Int. Cl.³ .................... B29D 7/24; B29C 17/02
[52] U.S. Cl. ...................... 264/210.7; 264/290.2; 528/176; 528/298
[58] Field of Search ............. 264/210.7, 235.6, 235.8, 264/290.2; 528/176, 298

[56] References Cited

U.S. PATENT DOCUMENTS

| | | | |
|---|---|---|---|
| 2,412,187 | 12/1946 | Wiley et al. | 18/12 |
| 2,465,319 | 3/1949 | Whinfield et al. | 260/75 |
| 2,823,421 | 2/1958 | Scarlett | 18/57 |
| 2,851,733 | 9/1958 | Pangonis et al. | 18/48 |
| 2,920,352 | 1/1960 | Miller et al. | 18/57 |
| 2,995,779 | 8/1961 | Winter | 18/48 |
| 3,057,825 | 10/1962 | Tassler | 260/75 |
| 3,161,711 | 12/1964 | Tassler | 264/289 |
| 3,303,528 | 2/1967 | Gageur | 18/1 |
| 3,325,575 | 6/1967 | Last | 264/290.2 |
| 3,429,961 | 2/1969 | Spencer | 264/289 |
| 3,702,357 | 11/1972 | Smith, Jr. | 264/289 |
| 3,880,974 | 4/1975 | Nohtomi et al. | 264/290.2 |

FOREIGN PATENT DOCUMENTS

753603 7/1956 United Kingdom.

Primary Examiner—James B. Lowe

[57] ABSTRACT

A process is disclosed for transversely stretching amorphous polyethylene terephthalate film wherein the temperature is adjusted to be substantially uniform across the web before stretching, heat is removed during stretching, and after stretching, the temperature is 1 to 15C.° lower and is uniform across the web.

9 Claims, 2 Drawing Figures

PROCESS FOR TRANSVERSELY STRETCHING POLYETHYLENE TEREPHTHALATE FILM

DESCRIPTION

1. Technical Field

This invention relates to continuously, transversely, stretching a moving, amorphous, polyethylene terephthalate film in such a way as to maintain the general cross-sectional shape of the film during the stretching. The process involves heating the moving film to the extent necessary for achieving a substantially uniform temperature in the film immediately prior to the stretching and for a short duration after commencing the stretching and then completing the stretching of the film, by line draw, in an atmosphere at a temperature lower than the starting temperature. The invention particularly relates to such transverse stretching of amorphous polyethylene terephthalate film having a convex transverse cross section.

2. Background Art

U.S. Pat. No. 3,702,357 issued Nov. 7, 1972 on the application of E. W. Smith discloses that polyethylene terephthalate film of improved product uniformity results from a transverse stretching with the film at very high temperatures, that is, about 125°–160° C. That patent appears to represent a teaching of improvement over U.S. Pat. No. 2,995,779 issued Aug. 15, 1961 on the application of F. R. Winter which discloses that transverse thickness variation in polyethylene terephthalate film can be reduced, or at least not increased in the stretching steps, if the film is transversely stretched before it is longitudinally stretched. It is disclosed therein that the film should be transversely stretched at a temperature of 80°–90° C., preferably 82°–85° C., and then heated to 90°–160° C. for the longitudinal stretch. There is no suggestion that the film should be cooled during the transverse stretch and, in fact, use of the device disclosed therein for practicing the stretching processes would result in heating the film.

British Pat. No. 753,603 published July 25, 1956 discloses that a polyethylene terephthalate film web is locally heated diagonally across the web during transverse stretching. The stretching is accomplished by gripping the film between diverging belts and pulleys with the temperature of the film under the diagonal heater between 70° and 120° C., usually about 80° C.

U.S. Pat. No. 3,057,825 issued Oct. 9, 1962 on the application of M. C. Tassler discloses transverse film stretching wherein heat is added to the film during the stretching. While that patent is primarily directed toward a longitudinal line drawing, the line drawing is preceded by transverse stretching in a manner such that the film temperature is maintained and not reduced. There is no suggestion that the film could be cooled during the transverse stretching.

U.S. Pat. No. 3,161,711 issued Dec. 15, 1964 on the application of M. C. Tassler discloses a transverse film stretching process for reducing gauge variations in a film web wherein relatively thick areas across the web are heated more than thin areas to permit the thick areas to stretch more quickly and easily than the thin areas. The temperature across the web is not constant, the transverse stretching is not line-draw, and the transverse gauge variations are not maintained.

U.S. Pat. No. 2,851,733 issued Sept. 16, 1958 on the application of W. J. Pangonis et al. discloses a process for stretching sheet film wherein the temperature of the film prior to stretching is adjusted to be substantially uniform across the sheet; and, during the entire stretching process, the sheet is cooled in a way to generate the thicker-hotter, thinner-cooler areas as disclosed in U.S. Pat. No. 3,161,711, previously discussed. Because thicker areas retain more heat than thinner areas in a cooling environment, the thicker areas are disclosed to stretch more than the thinner areas. Such stretching is not line-draw, but uniform, in areas of higher temperatures and, to the extent that the stretching process of U.S. Pat. No. 2,851,733 is effective, thickness variations in the film are reduced by the stretching. When such stretching is completed, the temperature across the sheet is unequal and is greater than the temperature of the environment. Moreover, in the stretching in that patent, the film is subjected to cooling air at, or even before, the commencement of the stretching. The process of that patent is directed toward making biaxially oriented film and cooling is always practiced in the second direction stretch wherein the film is no longer amorphous due to crystallization which has occurred during the first direction stretch.

DESCRIPTION OF THE INVENTION

According to the present invention there is provided a process for continually stretching a moving web of substantially amorphous thermoplastic film material transverse to the direction of motion comprising the steps of heating the web to a substantially uniform temperature above the second order transition temperature across the web, introducing the web to a transverse stretching means, stretching the web to an initial degree of from 5 to 25 percent of the total stretching degree intended while maintaining the temperature of the web at the same temperature as it was when it was introduced to the transverse stretching means, and then stretching the web to the total stretching degree of from about 2.5 to 5.5 times the width of the web while maintaining the web and the atmosphere surrounding the web at a temperature of about 1 to 15 Celsius degrees below the temperature of the web as it is introduced into the transverse stretching means but above the second order transition temperature.

The invention is particularly suitable for stretching a web of polyethylene terephthalate film material having a convex cross-sectional shape to achieve a stretched web with a retained convex cross-sectional shape. The process is most often performed as an integral part of a process which includes extruding a molten web of the thermoplastic material, quenching the molten web to solidify it into a substantially amorphous form, heating the quenched web to the temperature and conditions required for the stretching of this invention and then stretching the web in accordance with the invention.

The element of the process of this invention which is believed to be essential to practicing the process and to obtaining the result of the process, resides not only in cooling the web during most of the stretching but in commencing the stretching with the web at a substantially uniform temperature and partially stretching the web before cooling. As will be explained more completely below, it is believed to be important to commence stretching at the thinnest areas of the web and proceed with the stretching toward so-called "reinforcement" of those areas before cooling the web to increase the tendency for stretching of the thicker areas of the web. This essential element of the invention is believed to be of particular importance in stretching webs of convex cross-sectional shape because it is important, in stretching such webs, to commence the stretching at the web edges.

The invention can be practiced on any thermoplastic polymeric film so long as it is in a substantially amorphous condition and, generally, exhibits a glass transition temperature of greater than 50° C. By "substantially amorphous" is meant substantially molecularly unoriented whereby less than about ten percent of the thermoplastic polymer is crystallized. Eligible polymeric materials include: polyethylene-2,6-naphthalate; polytetramethylene-1,2-dioxybenzoate; polyethylene-1,5-naphthalate; and homopolymers and copolymers of ethylene terephthalate and ethylene isophthalate. The invention will be described with regard to polyethylene terephthalate film, such as that formed by the process disclosed in U.S. Pat. No. 2,465,319. The polyethylene terephthalate may be prepared by the condensation of ethylene glycol and terephthalic acid or by carrying out an ester interchange reaction between ethylene glycol and a dialkyl ester of terephthalic acid, e.g., dimethyl terephthalate. The films may then be prepared by extruding the molten polymers through a narrow orifice at a temperature of 270°-315° C. and quenching the polymer in film form to 30°-60° C. The present invention is applicable to films prepared from polyethylene terephthalate homopolymer, and also from copolyesters of polyethylene terephthalate. These copolymers are synthetic linear glycol-dicarboxylate polyesters wherein at least about 75 mole percent of the recurring structural units are ethylene terephthalate structural units. Thus, the terephthalate radicals may be the sole dicarboxylate constituent of the recurring structural units, or up to 25% of the recurring structural units may contain other dicarboxylic radicals, such as adipate, sebacate, or isophthalate.

In the manufacture of highly tensilized oriented film products, such as for the base material in magnetic recording tape, the web is stretched in an unbalanced way to provide greater strength in the longitudinal direction and then the web is slitted into narrow ribbons of product for final use. It is a desirable quality of a web for this use that it have similar orientation across the width of the web so that ribbons slitted from the web will have similar properties and handling characteristics.

Highly tensilized oriented webs are stretched in the direction of their length (sometimes known as the machine direction) at least 4 and sometimes as much as 6 to 7 times their original length. Machine direction stretching to such a degree is accompanied by two undesirable characteristics: first, there is a tendency for webs subjected to such longitudinal stretching to fibrillate; and second, there is a tendency for the web to become narrower by "necking in" at the edges. Because the stretching is a process which is directly releated to area of film material and because the area of the center of the stretched film has increased more than the area of the necked-in edges, the center of the stretched film is thinner than the edges if the original, unstretched, film was flat.

Fibrillation of longitudinally stretched film is avoided by stretching the web first in the direction transverse to the length of the web. In stretching during manufacture or winding of the web, the web is stretched transverse to the direction of motion which is the machine or longitudinal direction. Providing a transverse stretch of from about 2.5 to 5.5 times the width of the web before the longitudinal stretch, permits a subsequent longitudinal stretch without fibrillation.

An important factor in this invention was the realization that any transverse stretch in the manufacture of tensilized film should result in a web thicker in the center than at the edges so that the longitudinal stretch will result in a flat film. While the invention may extend to other webs, it is most particularly suited to webs of convex shape. The transverse stretch of this invention operates to preserve the cross-sectional shape of the web before stretching.

The transverse stretching can be conducted using any of the well-known transverse stretching means or their equivalents. The film can be held on diverging pins or clips as in a tentering frame such a has been disclosed in U.S. Pat. Nos. 2,823,421 and 3,303,528. The system of belts and pulleys disclosed in British Pat. No. 753,603 may also be useful to accomplish the transverse stretching.

Control and adjustment of the temperature of the web and of the atmosphere surrounding the web is of critical importance in the practice of this invention. Heating can be supplied by radiant heaters or by means of heated air and cooling can be supplied by slightly chilled air. The process is conducted at temperatures determined as a function of the second order transition temperature of the thermoplastic material to be stretched. The second order transition temperature is the temperature at which a discontinuity occurs when a first derivative thermodynamic quantity is plotted versus temperature for the polymer. In practice, the second order transition temperature is determined by plotting linear expansion or specific heat, or the like, of a polymeric material versus the temperature and noting the second order transition temperature as the temperature at which a point of inflection or discontinuity occurs. The second order transition temperature for some exemplary polymers are as follows:

| | |
|---|---|
| Polyethylene terephthalate | 78°C. |
| Polyethylene-2,6-naphthalate | 113 |
| Polytetramethylene-1,2-dioxybenzoate | 53 |
| Polyethylene-1,5-naphthalate | 71 |
| Copolymer, ethylene terephthalate (70-100%)/ethylene isophthalate (0-30%) | 51-78 |

In the preferred method for practicing the invention, the temperature of the atmosphere surrounding the web to be stretched is controlled and adjusted by means of heated air. A tenter frame having rails with moving clips is used whereby there is a heating zone with the rails parallel, an initial stretching zone with the rails diverging, and, relatively speaking, a cooling zone with the rails diverging. The tenter frame is enclosed by air plenums and heated air is directed toward the web such that the temperature of the web in the heating zone is from 10 to 35 Celsius degrees above the second order transition temperature of the polymeric material to be stretched and air is directed toward the web in the cooling zone such that the temperature of the web is from 1 to 15 Celsius degrees below the temperature of the web in the heating zone but above the second order transition temperature. In practicing the invention on polyethylene terephthalate webs, the preferred temperature of the web in the heating zone is 85 to 105 degrees Celsius.

The initial stretching zone, where there are neither the heating forces of the heating zone nor the cooling forces of the cooling zone, provides the film web with an initial degree of stretching of from 5 to 25 percent of the total stretching degree. The film web enters the initial stretching zone with a temperature substantially uniform across the web; and, by the initial stretching without heating or cooling forces, the thinner areas of the web are stretched to a degree approaching an initial reinforcement elongation.

Referring to FIG. 1, which is a graphical representation of the relationship between stretching force and the extent of stretching for polyethylene terephthalate at a particular stretching rate, it can be seen that, after an initial, rather rapid, increase in the force required for stretching, there is a plateau wherein little additional force is required for significant stretching. The effect is more pronounced for lower stretching temperatures and, for polyethylene terephthalate at temperatures of about 80°-84° C., the required stretching force even exhibits a maximum after which the stretching requires reduced force and is spontaneous until shortly after the onset of reinforcement. Reinforcement is identified as the point in the stress-strain relationship where the required force begins a significant increase after the plateau. Onset of reinforcement is, by its nature, rather arbitrary; but is shown in FIG. 1 as it relates to the force and extent of stretching for the parameter of changing temperature. It should be understood that the force required for a particular stretch ratio at a particular temperature changes somewhat with changes in the rate of stretching. The rate of stretching of 12,300 percent per minute in FIG. 1, was chosen as a typical stretching rate exemplary of stretching rates in general but with the understanding that the shapes of the curves change slightly at higher and lower rates of stretching.

FIG. 2 is a graphical representation, for polyethylene terephthalate, of the stretch ratio at the onset of reinforcement for various temperatures. Just as the polyethylene terephthalate stress-strain curves of FIG. 1 change with change in strain rate, so, also, do the points of the onset of reinforcement. The onset of reinforcement in FIG. 2 is, therefore, shown as a range of values which generally embrace the onset of reinforcement for strain rates from about 3000 percent per minute to about 38,500 percent per minute. Stretch ratio is the distance between two characteristic points on a web after stretching divided by the distance between those same points before stretching.

In the practice of this invention, starting the web stretch at a substantially uniform web temperature before cooling has commenced gives rise to localized stretching at the thinnest portions of the web. Such localized stretching is termed line-drawing and occurs as a line wherein there is stretching of increments of the film to the onset of reinforcement followed by stretching of other, usually adjacent, increments of the web requiring the same force as the force which was required at the onset of reinforcement for the previously stretched increment. Line-draw stretching, thus started without cooling, continues as line-draw stretching transversely across the web even after the web enters into the cooling zone of the tenter until the stretching is completed across the web. In the case of webs with a convex cross-sectional shape, a line-draw pattern is exhibited along the stretching means with lines of draw commencing near outer, thinner, edges of the moving webs and meeting in the center, thicker part of the moving webs.

Referring to FIG. 2, it would be expected that, as the temperature of the web is decreased by movement through the cooling zone, the stretch ratio of the web would be decreased and the degree of stretch across the web would be expected to be nonuniform. The practice of this invention, including initial stretching with no cooling and total stretching with cooling, results, unexpectedly, in uniform stretch ratios and uniform stretching across the web. It has been theorized that internal heat generated in stretching is counteracted by the temperature of the atmosphere in the cooling zone, thus giving rise to conditions which result in a uniform stretch ratio across the web. Whether or not the theory is correct, the fact is that transverse stretching practiced in accord with the present invention results in transverse stretching with a stretch ratio of greatly improved uniformity; and transverse stretching of a web with a convex cross-sectional shape results in a web with a convex cross-sectional shape of proportional dimensions.

DESCRIPTION OF THE PREFERRED EMBODIMENTS

EXAMPLE 1

Figure 1:
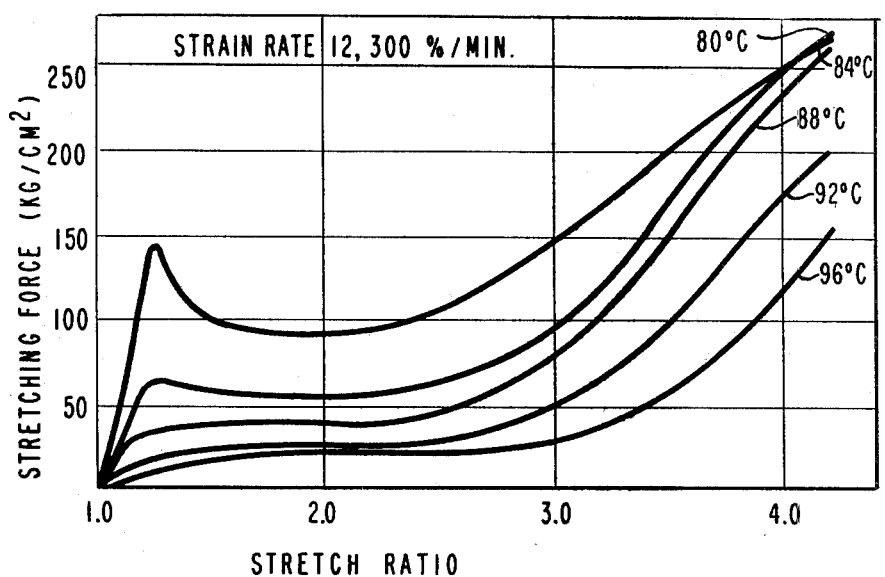
Figure 2:
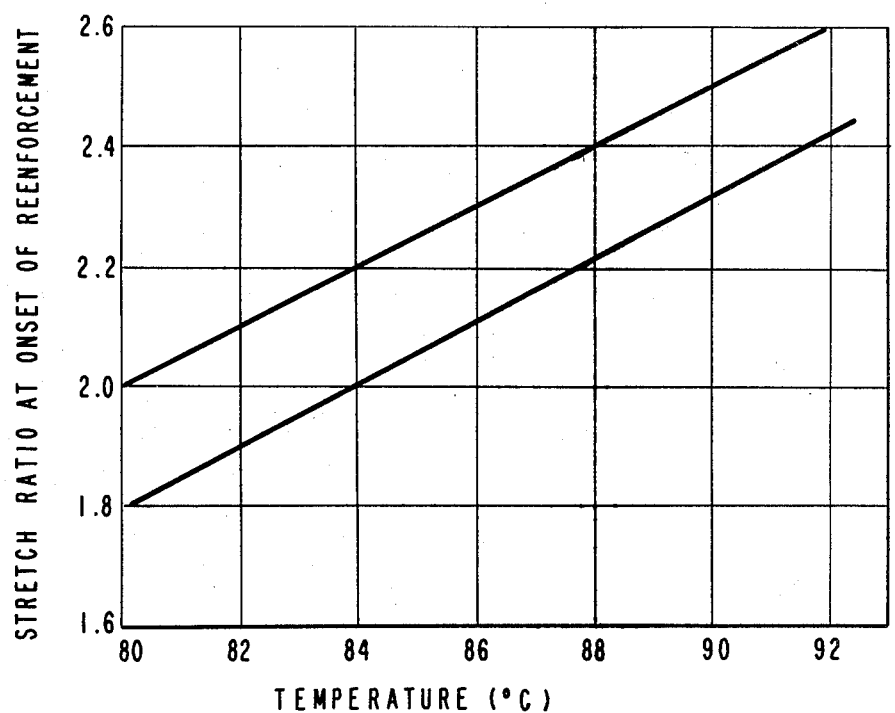

This example is to provide a comparison of the transverse stretching of this invention with a control represented by the transverse stretching of the prior art as disclosed, for instance, in U.S. Pat. No. 2,995,779.

A substantially amorphous film of polyethylene terephthalate was extruded at a temperature of about 280° C. from a die having a convex contour onto a quench drum where it was quenched to a temperature of about 45° C. The resulting film was split down the center to provide two webs of indefinite length and about 60 centimeters wide. Due to the convex die contour, each web had a thin edge of about 165 micrometers and a thick edge of about 240 micrometers.

To provide the comparison, one of the webs was transversely stretched under the conditions of the control and the other web was stretched under the conditions of this invention. Each of the webs was imprinted with a grid pattern to enable measurement of localized stretch ratios across the web.

The means for transversely stretching the film was a film tentering means similar to that disclosed in U.S. Pat. No. 2,823,421. The stretcher had a heating zone (identified in U.S. Pat. No. 2,823,421 as a "preheating" section) about 1.2 meters long and was fitted with ducts to direct hot air onto the film in the heating zone. The transverse stretching section of the stretcher was about 3 meters long with the rails spaced about 32 centimeters apart at the inlet and spaced about 134 centimeters apart at the outlet for an overall stretch ratio of 4.2. The transverse stretching section of the stretcher was also fitted with ducts to direct air onto the moving film.

For the control stretching, one of the webs was moved through the stretching means with the temperature of the air in the heating zone adjusted to make the film temperature about 80° C. at the beginning of the stretching section and with the temperature of air directed on the film over the length of the entire stretching section adjusted to heat the film from a substantially uniform temperature of about 80° C. across the web at the beginning of the stretching section to about 99° C. at the end of the stretching section.

For the stretching in accordance with the teaching of this invention, duct-work in the film tentering means was modified such that the first 15 centimeters (5%) of the transverse stretching section had neither heating nor cooling directed onto the web; and the other web was moved through the heating zone and introduced into the stretching section with the temperature of the air in the heating zone adjusted to heat the film from a substantially uniform temperature of about 94° C. across the web at the beginning of the stretching section.

The initial part of the transverse stretching section wherein there were neither heating nor cooling forces is herein termed the initial stretching zone and the final part of the transverse stretching section wherein the ducts are utilized to reduce the temperature of the film is herein termed the cooling zone.

The temperature of the film both entering and leaving the initial stretching zone was about 94° C., thus, the initial stretching of the web was accomplished at a substantially uniform temperature. The temperature of the air directed from the ducts onto the film over the cooling zone in the transverse section was adjusted to cool the film from a substantially uniform temperature of about 94° C. across the web at the beginning of the cooling zone to a substantially uniform temperature of about 90° C. across the web at the end of the cooling zone.

In a measure of the effectiveness of the transverse stretching of this invention to yield a film with uniform stretch ratios across the web, individual stretch ratios were determined across each of the stretched webs using the previously-applied grid lines as reference points. The following table provides those stretch ratios as a function of location across the webs with the thick edge of the webs being at the left side of the table.

| | Stretch Ratios |
|---|---|
| Control | 4.2 4.4 4.5 4.3 4.1 4.0 3.8 3.7 3.6 3.6 |
| Invention | 4.1 4.2 4.2 4.1 4.2 4.2 4.2 4.0 4.0 3.8 |

The stretch ratios measured at each edge of the webs are not considered correct because of the proximity of the tenter clips which hold the film directly in those edge areas and sometimes cause local deformations.

The uniformity of stretch ratios across the web stretched by the process of this invention is apparent and represents a clear improvement over the method of the control.

EXAMPLE 2

As a large-scale test with industrial applicability, an amorphous polyethylene terephthalate web about 120 centimeters wide with a convex or wedge-shaped cross section (about 165 micrometers at the edges and about 240 micrometers at the center) was stretched in a transverse stretching means similar to the device of the previous example but constructed on a larger scale. The stretching means had a heating zone about 2.0 meters long and a transverse stretching section about 8.2 meters long with the rails spaced about 1.2 meters apart at the inlet and about 4.2 meters apart at the outlet for an overall stretch ratio of 3.5.

Heating was accomplished, in the heating zone, by means of air nozzles located about 18 centimeters from the film which direct air through 1.5 centimeter slits toward the film at a velocity of about 350 meters per minute. The last nozzle in the heating zone was located about 36 centimeters upstream from the beginning of the transverse stretching section.

There were, of course, no nozzles in the initial stretching zone which zone extends about 72 centimeters from the beginning of the transverse stretching section downstream to the first nozzles of the cooling zone. The initial stretching zone made up about 8.8% of the transverse stretching section. Nozzles in the cooling zone were of the same size and positioning as was used for nozzles in the heating zone.

The web was introduced into and conducted through the transverse stretching means at a rate of about 11 meters per minute with air from the heating zone nozzles adjusted to place the film temperature at 94° C. substantially uniformly across the web at the end of the heating zone; and air from the cooling zone nozzles adjusted to reduce the film temperature from 94° C. at the beginning of the cooling zone to 88° C. at the end of the cooling zone.

After the transverse stretching, the web was subjected to a longitudinal stretching of 4.7 times its original length and was then heat set at a temperature of about 190° C.

As a control, the tentering means of this example was set up to provide air, in the heating zone, to make the film temperature about 87° C. at the beginning of the transverse stretching section; and, in the transverse stretching section, to make the film temperature increase from 87° C. to about 94° C. at the end of the stretching section.

Comparative results of the stretching of this invention and the control were obtained by determining birefringence in the webs and by measuring stretch ratios across the webs in the same manner as was done in Example 1.

Birefringence refers to the difference in refractive indices between the major and minor directions in the plane of the film and is a measure of uniformity of orientation across the web as well as a measure of the degree of balance of orientation in the major and minor directions. For example, a birefringence of zero would indicate a film of equal orientation in the major and minor directions and the same birefringence across a web would indicate a uniformity of orientation across the web. Birefringence is further discussed in U.S. Pat. No. 3,702,357. Birefringence determinations were made on the webs of this example after the transverse stretch and before the machine direction stretch; and the results were as follows:

| | edge | center | edge |
|---|---|---|---|
| Control | 0.0665 | 0.0610 | 0.0713 |
| Invention | 0.0655 | 0.0606 | 0.0614 |

The following Table provides stretch ratios as a function of location across the webs for the control and practice of the invention in this example.

| | Stretch Ratios | | | | | | | |
|---|---|---|---|---|---|---|---|---|
| Control | 3.8 | 3.6 | 3.6 | 3.7 | 3.4 | 3.5 | 3.5 | 3.6 |
| Invention | 3.6 | 3.6 | 3.4 | 3.4 | 3.4 | 3.4 | 3.4 | 3.6 |

The uniformity of birefringence values and stretch ratios across the web stretched by the process of this invention is apparent and represents a clear improvement over the method of the control.

I claim:

1. A process for continually stretching a moving web of substantially amorphous thermoplastic film material transverse to the direction of motion comprising the steps of:
    (a) heating a moving web of the thermoplastic film material to a substantially uniform temperature across the web;—said temperature being from 10 to 35 Celsius degrees above the second order transition temperature of the thermoplastic material;
    (b) introducing the moving web to a transverse stretching means;
    (c) stretching the moving web in the transverse streching means to an initial degree more than about 5 percent and less than about 25 percent of a total stretching degree;
    (d) maintaining the temperature of the moving web during the initial stretching at a temperature about equal to the temperature of the web in step (a);
    (e) stretching the moving web in the transverse stretching means to the total stretching degree, that is, more than 2.5 and less than 5.5 times the width of the web before stretching was begun;
    (f) maintaining the web and the atmosphere surrounding the moving web during the stretching of step (e) at a temperature of about 1 to 15 Celsius degrees below the temperature of the web in step (a) whereby the web in the stretching means, while being stretched, is cooling toward the temperature of step (e) and, after being stretched, exhibits a substantially uniform temperature across the web and substantially equal to the temperature of the atmosphere in step (e).

2. The process of claim 1 wherein the thermoplastic film material is polyethylene terephthalate.

3. The process of claim 2 wherein the temperature of the film material before stretching is substantially the same across the web and is from 85° to 105° C.

4. The process of claim 3 wherein the moving web, during stretching, is cooled to, from 1 to 15 Celsius degrees below the temperature of the web before stretching but above the second order transition temperature.

5. The process of claim 1 wherein the transverse stretching means is a film tentering means.

6. A process for continuously transversely versely line-drawing substantially amorphous polyethylene terephthalate film material comprising the steps of:
    (a) adjusting the temperature of a moving web of polyethylene terephthalate to be substantially uniform across the web and within a range of 85° to 105° C.;
    (b) introducing the moving web to a transverse stretching means;
    (c) stretching the moving web in the transverse stretching means to an initial degree more than about 5 percent and less than about 25 percent of the total stretching degree;
    (d) maintaining the temperature of the moving web during the stretching at a temperature about equal to the temperature of the web in (a);
    (e) stretching the moving web in the transverse stretching means to the total stretching degree, that is, more than 2.5 and less than 5.5 times the width of the web before stretching was begun;
    (f) maintaining the atmosphere surrounding the moving web during the stretching of step (e) at a temperature of about 1 to 15 Celsius degrees below the temperature of the web in step (a) but above the second order transition temperature, to cause line-draw stretching across the web along the stretching means.

7. The process of claim 6 wherein the substantially amorphous polyethylene terephthalate film material has a convex cross-sectional shape when it is introduced to the stretching means prior to stretching; exhibits a line-draw pattern along the stretching means with lines of draw commencing near outer edges of the moving film and meeting in the center of the moving film; and has a convex cross-sectional shape when the stretching is completed.

8. Film stretched by the process of claim 1.

9. A process for manufacturing an oriented film comprising the steps of:
    (a) extruding a molten web of thermoplastic material;
    (b) quenching the molten web to solidify it in a substantially amorphous form;
    (c) heating the quenched web to a substantially uniform temperature across the web;—said temperature being from 10 to 35 Celsius degrees above the second order transition temperature of the thermoplastic material;
    (d) introducing the web to a transverse stretching means;
    (d) stretching the web in the transverse stretching means to an initial degree more than about 5 percent and less than about 25 percent of the total stretching degree;
    (f) maintaining the temperature of the moving web during the initial stretching at a temperature about equal to the temperature of the web in step (c);
    (g) stretching the moving web in the transverse stretching means to the total stretching degree, that is, more than 2.5 and less than 5.5 times the width of the web before stretching was begun;
    (h) maintaining the atmosphere surrounding the moving web during the stretching of step (g) at a temperature of about 1 to 15 Celsius degrees below the temperature of the web in step (c) but above the second order transition temperature, whereby the web in the stretching means, while being stretched, is cooling toward the temperture of step (h) and, after being stretched, exhibits a substantially uniform temperature across the web and substantially equal to the temperature of the atmosphere in step (h).

* * * * *